(12) United States Patent
Lee

(10) Patent No.: US 11,560,138 B2
(45) Date of Patent: Jan. 24, 2023

(54) BATTERY DISCHARGE LIMIT CONTROL SYSTEM AND METHOD

(71) Applicants: Hyundai Motor Company, Seoul (KR); Kia Motors Corporation, Seoul (KR)

(72) Inventor: Chang Min Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 391 days.

(21) Appl. No.: 16/658,552

(22) Filed: Oct. 21, 2019

(65) Prior Publication Data

US 2020/0361446 A1 Nov. 19, 2020

(30) Foreign Application Priority Data

May 17, 2019 (KR) ........................ 10-2019-0057991

(51) Int. Cl.
*B60W 20/40* (2016.01)
*B60L 58/13* (2019.01)
*B60L 58/14* (2019.01)
*B60W 10/06* (2006.01)
*B60W 10/08* (2006.01)
*B60W 10/26* (2006.01)
*B60W 20/13* (2016.01)
*B60W 20/20* (2016.01)
(Continued)

(52) U.S. Cl.
CPC ............. *B60W 20/40* (2013.01); *B60L 58/13* (2019.02); *B60L 58/14* (2019.02); *B60W 10/06* (2013.01); *B60W 10/08* (2013.01); *B60W 10/26* (2013.01); *B60W 20/13* (2016.01); *B60W 20/20* (2013.01); *H01M 10/44* (2013.01); *H01M 10/48* (2013.01); *H01M 50/572* (2021.01); *B60L 2240/54* (2013.01); *B60W 2510/244* (2013.01); *B60W 2710/02* (2013.01); *B60W 2710/081* (2013.01)

(58) Field of Classification Search
None
See application file for complete search history.

(56) References Cited

U.S. PATENT DOCUMENTS

| 2010/0113211 A1* | 5/2010 | Schneider | B60K 6/543 476/31 |
| 2016/0152152 A1* | 6/2016 | Gaither | B60K 6/365 701/22 |

(Continued)

FOREIGN PATENT DOCUMENTS

| KR | 2014-0146907 A | 12/2014 |
| KR | 20150001982 A | 1/2015 |

*Primary Examiner* — Todd Melton
*Assistant Examiner* — Jason R Roberson
(74) *Attorney, Agent, or Firm* — Fox Rothschild LLP

(57) ABSTRACT

A battery discharge limit control system is provided. The system includes a motor driven by receiving the power stored in a battery and a clutch connected to the rotary shaft of the motor. Additionally, an engine includes the rotary shaft connected to the rotary shaft of the motor through the clutch and a transmission changes the rotational speed of the rotary shaft of the motor or the engine based on the input of the shift stage instruction to output the rotational speed to a driving wheel of a vehicle. A controller opens the clutch and drives the motor in the reverse rotation, when the input of the shift stage instruction is a reverse shift stage.

5 Claims, 3 Drawing Sheets

(51) Int. Cl.
  *H01M 10/44* (2006.01)
  *H01M 10/48* (2006.01)
  *H01M 50/572* (2021.01)

(56) References Cited

U.S. PATENT DOCUMENTS

2016/0152225 A1* 6/2016 Aoki .................... B60W 20/13
                                              701/22
2018/0304747 A1* 10/2018 Vollmer ................ B60K 25/02

* cited by examiner

US 11,560,138 B2

BATTERY DISCHARGE LIMIT CONTROL SYSTEM AND METHOD

CROSS REFERENCE TO RELATED APPLICATION

The present application claims priority of Korean Patent Application No. 10-2019-0057991 filed on May 17, 2019, the entire contents of which is incorporated herein for all purposes by this reference.

BACKGROUND

Field of the Disclosure

The present disclosure relates to a battery discharge limit control system and method, and more particularly, to a system and a method for controlling the discharge limit of a battery, which reversely drives a motor during the reverse operation in a hybrid vehicle without applying a transmission having a separate reverse gear.

Description of the Related Art

A hybrid vehicle is a type of an eco-friendly vehicle that provides a driving force to a wheel of a vehicle by selectively using an engine for generating the rotational force by combusting fossil fuel and an electric motor for generating the rotational force using electric energy according to the vehicle traveling condition or the vehicle condition. Generally, the hybrid vehicle includes an engine clutch for selectively connecting the rotary shaft of the engine and the rotary shaft of the electric motor, the hybrid mode coupling the engine clutch to provide the rotational force of the engine to the wheel of the vehicle or provides the rotational force of the engine and the rotational force of the electric motor together to the wheel, and the electric vehicle mode opens the engine clutch to provide the rotational force of the electric motor to the wheel of the vehicle to drive the vehicle.

Some hybrid vehicles apply a technique of omitting the reverse gear in the transmission disposed between the power source such as the engine or the electric motor and the wheel, and reverses the vehicle by reversely rotating the electric motor during the reverse operation. Additionally, a battery that provides electric energy to the electric motor limits its output according to the state of charge (SOC) thereof. For example, performed is a control in which as the state of charge of the battery is decreased, the output of the battery is limited to a lower level and thus, the battery is completely discharged, thereby preventing the vehicle from being unable to travel and secures operability.

For a vehicle having no reverse gear to which the battery discharge limit control is applied, when the state of charge of the battery is low, the electric motor using the power of the battery by the battery discharge control is unable to be driven, and thus, the reverse of the vehicle becomes impossible. In other words, when the electric motor is unable to be driven due to the battery discharge control upon the forward traveling of the vehicle, the vehicle may travel by driving the engine, but since the vehicle without the reverse gear may reverse through the reverse rotation driving of the electric motor, the reverse of the vehicle itself may become impossible.

The foregoing explained as the background is intended merely to aid in the understanding of the background of the present disclosure, and is not intended to mean that the present disclosure falls within the purview of the related art that is already known to those skilled in the art.

SUMMARY

Therefore, the present disclosure provides a battery discharge limit control system and method capable of smoothly supplying the electric energy required for driving an electric motor in the reverse rotation for the reverse of the vehicle in a hybrid vehicle employing a transmission without a reverse gear.

According to one aspect, the present disclosure provides a battery discharge limit control system that may include a motor driven by receiving the power stored in a battery; a clutch connected to the rotary shaft of the motor; an engine having the rotary shaft connected to the rotary shaft of the motor through the clutch; a transmission configured to change the rotational speed of the rotary shaft of the motor or the engine based on the input of the shift stage instruction to output the rotational speed to a driving wheel of a vehicle; and a controller configured to open the clutch and drive the motor in the reverse rotation, when the input of the shift stage instruction is a reverse shift stage.

In an exemplary embodiment of the present disclosure, the controller may be configured to adjust the output of the motor by limiting the battery output based on the state of charge of the battery, and apply the output of the motor by increasing an output limit value limiting the output of the battery when the shift stage instruction is the reverse shift stage rather than a forward shift stage. In addition, the controller may include a first state of charge defensive map applied when the shift stage instruction is the forward shift stage and for storing the output limit value of the battery based on the state of charge of the battery and a second state of charge defensive map applied when the shift stage instruction is the reverse shift stage and for storing the output limit value of the battery based on the state of charge of the battery. The output limit value of the battery of the second state of charge defensive map may be greater than the output limit value of the battery of the first state of charge defensive map in the same state of charge.

An exemplary embodiment of the present disclosure may further include a hybrid starter generator configured to crank the engine and synchronize the rotational speed of the engine with the rotational speed of the motor when switching from an electric vehicle mode that drives only the motor to rotate the driving wheel to a hybrid mode that drives the engine to rotate the driving wheel. The controller, in the electric vehicle mode, may be configured to limit the output of the battery to secure a preliminary charge amount for driving the hybrid starter generator when the shift stage instruction is the forward shift stage, and limit the output of the battery without considering the preliminary charge amount when the shift stage instruction is the reverse shift stage.

According to another aspect, the present disclosure provides a battery discharge limit control using the above-described battery discharge limit control system that may include determining whether the shift stage instruction is the reverse shift stage; and limiting the output of the battery by further increasing an output limit value limiting the output of the battery when the shift stage instruction is the reverse shift stage to more than when the shift stage instruction is a forward shift stage.

In an exemplary embodiment of the present disclosure, the controller may include a first state of charge defensive map applied when the shift stage instruction is the forward shift stage and for storing the output limit value of the battery based on the state of charge of the battery, and a second state of charge defensive map applied when the shift stage instruction is the reverse shift stage and for storing the output limit value of the battery greater than the output limit value of the battery of the first state of charge defensive map in the same state of charge. The limiting of the output of the battery may include limiting the output of the battery by applying the second state of charge defensive map.

The battery discharge limit control system may further include a hybrid starter generator configured to crank the engine and synchronize the rotational speed of the engine with the rotational speed of the motor, when switching from an electric vehicle mode that drives only the motor to rotate the driving wheel to a hybrid mode that drives the engine to rotate the driving wheel. The limiting of the output of the battery may include, in the electric vehicle mode, limiting the output of the battery to secure a preliminary charge amount for driving the hybrid starter generator when the shift stage instruction is the forward shift stage, and limiting the output of the battery without considering the preliminary charge amount when the shift stage instruction is the reverse shift stage.

According to the battery discharge limit control system and method, it may be possible to set the battery output limit to secure sufficient state of charge of the battery for the reverse operation in the hybrid vehicle that removes the reverse gear in the transmission and drives the motor in the reverse rotation to drive the vehicle in reverse, thereby enhancing the reverse drivability of the vehicle and improving the merchantability of the vehicle.

The effects obtained by the present disclosure are not limited to the above-mentioned effects, and other effects not mentioned may be clearly understood by those skilled in the art to which the present disclosure pertains from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a battery discharge limit control system and method according to various embodiments of the present disclosure will be described in detail with reference to the accompanying drawings.

Figure 1:
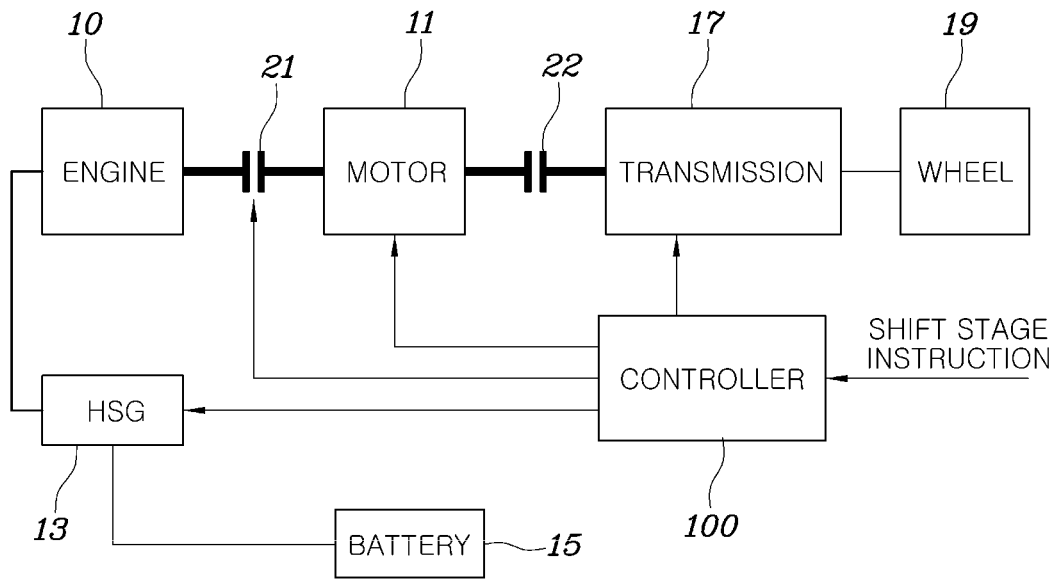
FIG. 1 is a block diagram showing a battery discharge limit control system according to an exemplary embodiment of the present disclosure.

FIG. 1 is a block diagram showing a battery discharge limit control system according to an exemplary embodiment of the present disclosure. Referring to FIG. 1, a battery discharge limit control system according to an exemplary embodiment of the present disclosure may include a battery 15, a motor 11 driven by receiving the power stored in the battery 15, a clutch 21 connected to the rotary shaft of the motor 11, an engine 10 having the rotary shaft connected to the rotary shaft of the motor 11 via the clutch 21, a transmission 17 configured to change the rotational speed of the rotary shaft of the motor 11 or the engine 10 based on the shift stage instruction input to output the rotational speed to a driving wheel of a vehicle, and a controller 15 configured to open the clutch 21 and drive the motor 11 in the reverse rotation when the shift stage instruction input is a reverse shift stage.

The engine 10 is an internal combustion engine for combusting fossil fuel to generate the rotational force, and the motor 11 is an element for converting electric energy into rotational kinetic energy to generate the rotational force. The hybrid vehicle may include two power sources including the engine 10 and the motor 11, and as necessary, operate in an electric vehicle (EV) mode in which the vehicle is driven by rotating a wheel 19 by the rotational force of the motor 11 and in a hybrid (HEV) mode in which the vehicle is driven by rotating the wheel 19 using the rotational force of the engine 10 or the rotational forces of the engine 10 and the motor 11 together.

The rotary shafts of the engine 10 and the motor 11 may be engaged with each other by the clutch 21 or separated from each other. In addition, the rotary shaft of the motor 11 may include an additional clutch 22 for connecting or disconnecting the transmission 17, which includes gears for determining the shift stage number. In the art, the clutch 21 disposed between the engine 10 and the motor 11 is also referred to as an engine clutch, and the clutch for connecting the transmission 17 is also referred to simply as a clutch. Since various exemplary embodiments of the present disclosure relate to the battery discharge limit control for the reverse rotation of the motor 11 during the reverse operation performed in a state where the clutch 21 has been engaged, it should be understood that the so-called clutch mostly refers to the engine clutch 21.

The transmission 17 includes the gears for shifting in the process of transferring the rotational force provided by the engine 10 and/or the motor 11 to the wheel, and may be configured to shift the rotational speed transferred to the wheel through the adjustment of the gear ratio. In a typical vehicle, the transmission may include separate gears for reverse shift stage engaged during the reverse operation, but various exemplary embodiments of the present disclosure may be applied to the vehicle that reverses the vehicle through the reverse rotation of the motor 11 and the transmission 17 omits the separate gears for reverse shift stage. For example, when the reverse shift stage instruction is input, the transmission 17 may engage the gear of the lowest shift stage among forward shift stages and reverse the vehicle through the reverse rotation of the motor 11.

An exemplary embodiment of the present disclosure may include a hybrid starter generator (HSG) 13 configured to crank the engine 10 and adjust the engine speed. The hybrid starter generator 13 is a type of electric motor configured to generate the rotational force using the power of the battery 15, and may provide the rotational force to the engine 10 when the power source is switched from the electric vehicle mode to the hybrid mode to be used for cranking the engine 10 and adjusting the engine speed.

The controller 100 may be configured to operate each of the components of the hybrid vehicle as described above, and it should be understood that the controller 100 may include various controllers (e.g., a battery management system, a hybrid control unit, a motor control unit, a mission control unit, etc.) provided within the hybrid vehicle, and the controller 100 may be implemented as one or more processors and one or more memories. The controller 100 may include a state of charge defensive map that limits the output of the battery 15. The output limit of the battery 15 may be generated based on a state of charge (SOC) of the battery, a battery temperature, a margin considering the operability, etc., and particularly, to stably maintain the state of charge of the battery to secure the operability of the hybrid vehicle, the controller 100 may include the state of charge defensive map.

Figure 2:
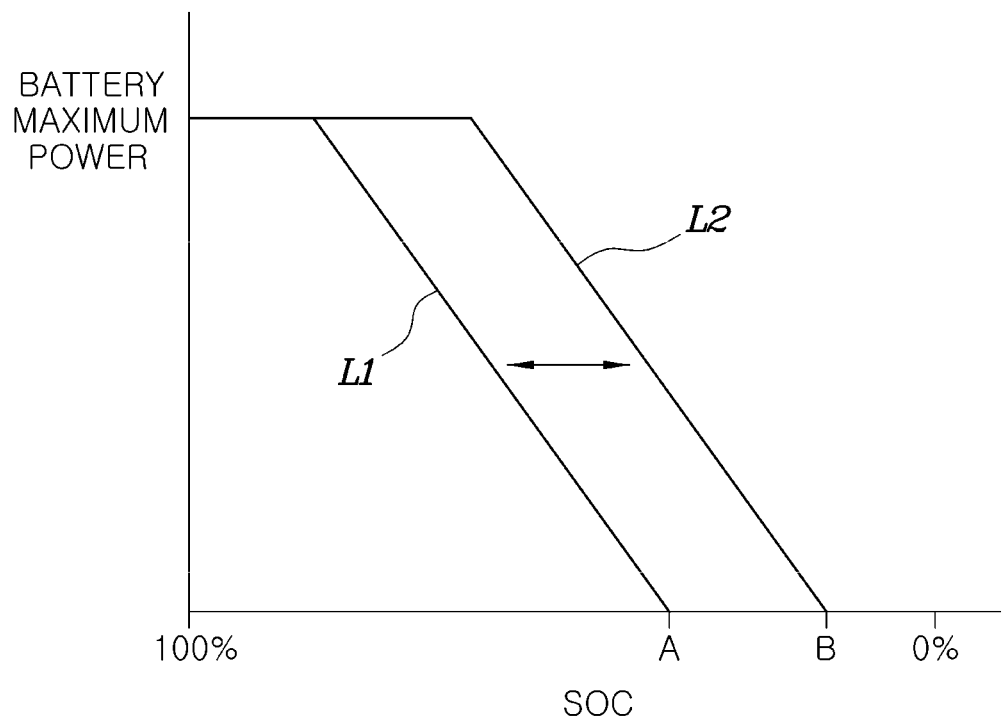
FIG. 2 is a diagram showing an example of a state of charge defensive map applied to a battery discharge limit control system and method according to an exemplary embodiment of the present disclosure.

FIG. 2 is a diagram showing an example of a state of charge defensive map applied to a battery discharge limit control system and method according to an exemplary embodiment of the present disclosure. FIG. 2 shows the state of charge defensive map. The state of charge defensive map may be stored in the controller 100 as a map in which the maximum output of the battery 15 has been previously determined according to the state of charge of the battery 15. When the hybrid vehicle travels forwards, that is, when the shift stage instruction for determining the shift stage of the transmission 17 is an instruction that corresponds to the forward travel, the controller 100 may be configured to perform the battery discharge limit by applying the state of charge defensive map as denoted by a reference numeral 'L1.' In an example of FIG. 2, the controller 100 may be configured to adjust the output of the battery 15 to zero when the state of charge of the battery 15 becomes A %.

In an exemplary embodiment of the present disclosure, the controller 100 may be configured to store the state of charge defensive map for reverse traveling as denoted by a reference numeral 'L2' in addition to the state of charge defensive map for forward traveling and apply the map during the reverse of the vehicle, that is, when the shift stage instruction corresponds to the reverse traveling. The state of charge defensive map for reverse traveling may be set to be greater than the state of charge defensive map for forward traveling in the maximum output limit of the battery in the same state of charge. Therefore, the state of charge defensive map for reverse traveling limits the battery output to zero at the state of charge B % lower than the state of charge defensive map for forward traveling.

As described above, in an exemplary embodiment of the present disclosure, the controller 100 may be configured to separately apply the state of charge defensive map for reverse traveling in which the output limit value of the battery 15 is set greater in the same state of charge to increase the application range of the battery 15 during the reverse of the vehicle, thereby solving a problem in that the reverse of the vehicle becomes impossible since the motor 11 is unable to be driven in the reverse rotation due to the battery output limit in the transmission 17 without separate reverse gear. For example, when one state of charge defensive map such as 'L1' in FIG. 2 is applied, the reverse of the vehicle becomes impossible if the state of charge of the battery 15 becomes A % while the vehicle is being driven. However, when the separate defensive map such as 'L2' applying a greater output limit value in the same state of charge is applied, the output of the battery 15 may be utilized even when the state of charge of the battery 15 becomes A %, and thus, the reverse of the vehicle becomes possible.

Figure 3:
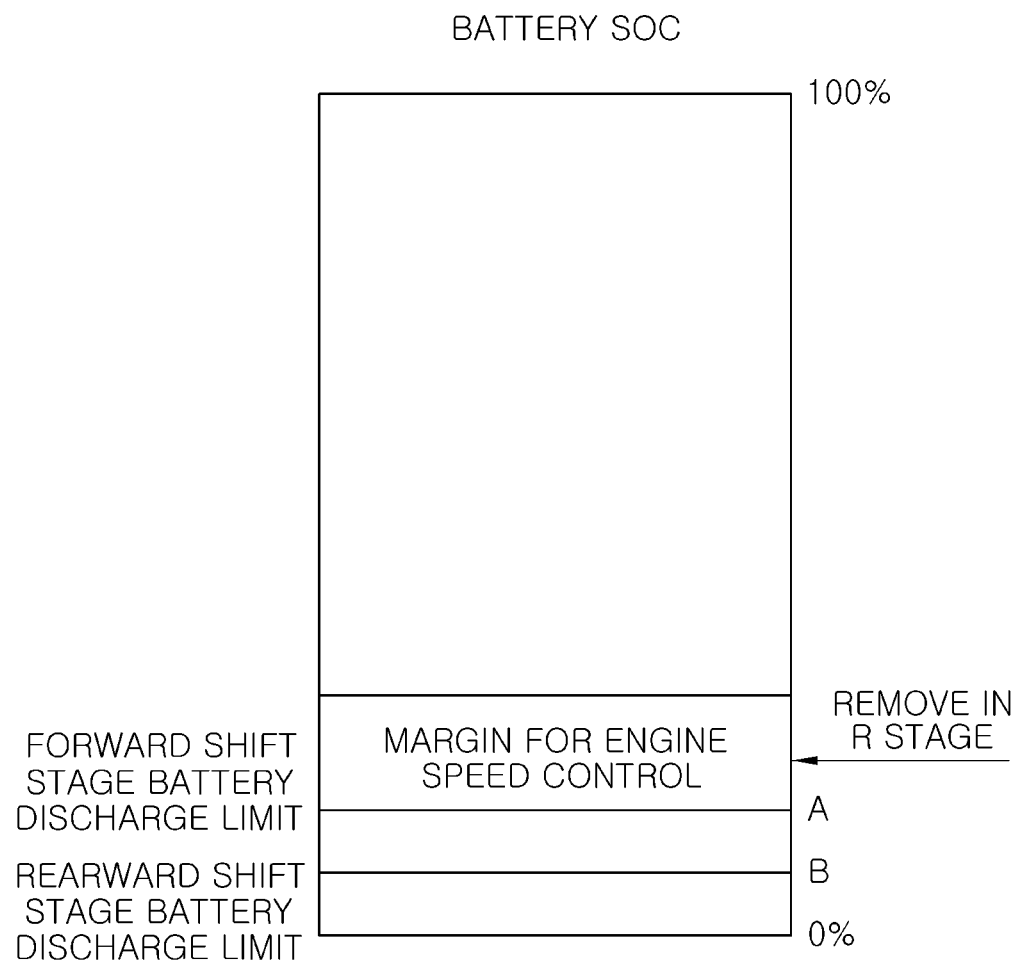
FIG. 3 is a diagram illustrating a technique of adjusting a preliminary charge amount for driving a hybrid starter generator applied to the battery discharge limit control system according to an exemplary embodiment of the present disclosure.

Meanwhile, the controller 100 may be configured to secure the preliminary charge amount for driving hybrid starter generator to drive the hybrid starter generator 13 that operates to crank the engine 10 and adjust the speed of the engine 10 for future hybrid mode traveling during the forward traveling in the electric vehicle mode of the vehicle. FIG. 3 is a diagram illustrating a technique of adjusting a preliminary charge amount for driving a hybrid starter generator applied in the battery discharge limit control system according to an exemplary embodiment of the present disclosure.

The controller 100 may be configured to secure the preliminary charge amount corresponding to a margin for engine speed control for use in future mode switching in the electric vehicle mode in addition to the battery discharge limit as described above. The hybrid starter generator 13 may be configured to crank the engine 10 and adjust the rotational speed of the engine 10 to be synchronized with the rotational speed of the motor in the electric vehicle mode, when the traveling mode of the vehicle is changed from the electric vehicle mode to the hybrid mode. Accordingly, the heterogeneous feeling such as rattling of the vehicle caused by suddenly changing the speed when the clutch 21 has been engaged may be prevented.

The controller 100 may be configured to change the state of charge of the battery 15, as shown in FIG. 3, to preliminarily store the power used to drive the hybrid starter generator 13 in the electric vehicle mode. An exemplary embodiment of the present disclosure may be configured to adjust the output of the battery 15 to allow the preliminary energy for engine speed control of the hybrid starter generator 13 to be stored in the battery 15, when the vehicle travels forwards, that is, when the shift stage instruction is the forward shift stage and the vehicle operates in the electric vehicle mode. Therefore, when the vehicle travels forwards in the electric vehicle mode, as shown in FIG. 3, the preliminary charge amount set to the margin for engine speed control may be added to the lowest state of charge (A) set for the discharge limit by the state of charge defensive map to perform the discharge limit of the battery.

In addition, it is not necessary to crank the engine 10 during the reverse traveling of the vehicle, that is, when the shift stage instruction is the forward shift stage, thereby removing the preliminary charge amount setting for engine speed adjustment and limiting the output of the battery 15. Therefore, it may be possible to drive the motor 11 for the reverse of the vehicle until the lowest state of charge set in the above-described state of charge defensive map for reverse traveling (i.e., the battery output limit value is zero). As described above, it may be possible to omit the preliminary energy for engine speed adjustment to secure the sufficient energy for the reverse of the vehicle, thereby helping to secure the reverse operability.

Figure 4:
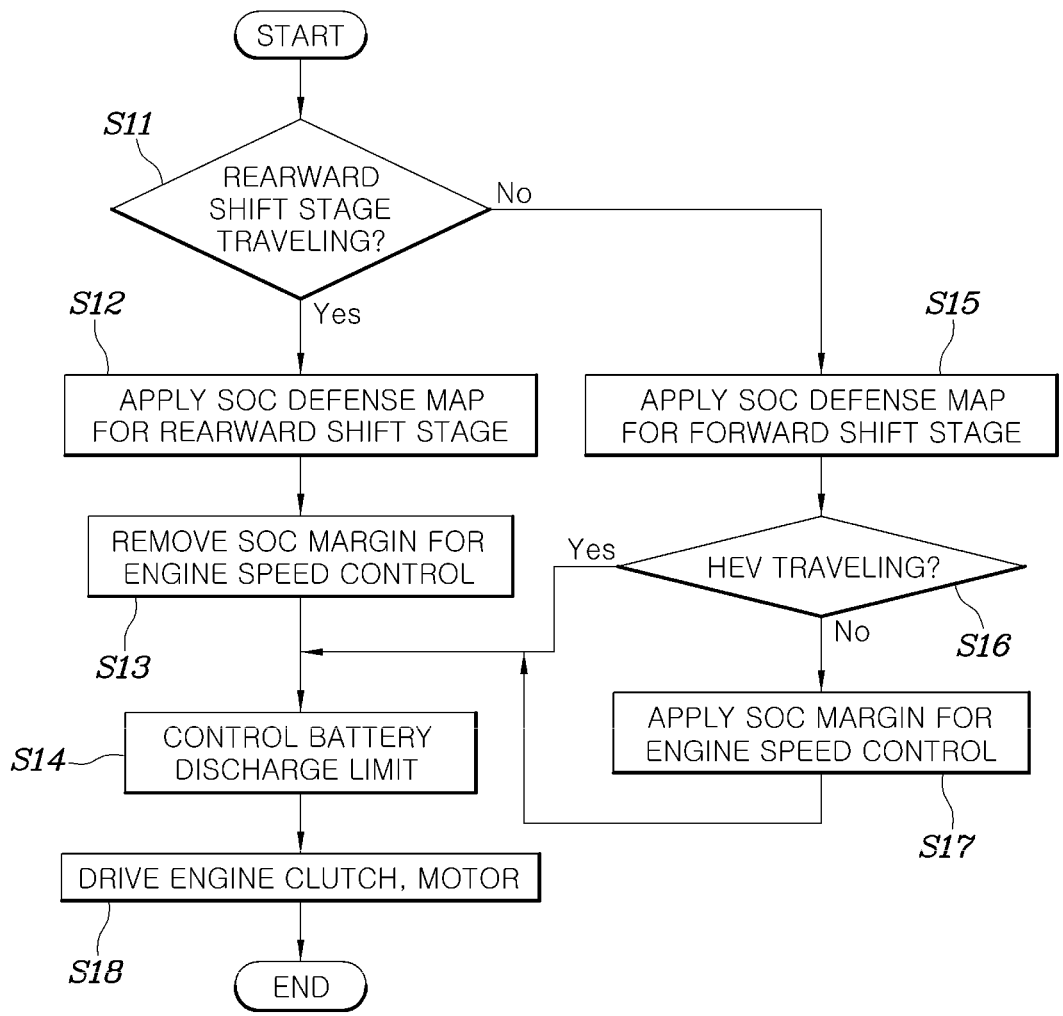
FIG. 4 is a flowchart diagram showing a battery discharge limit control method according to an exemplary embodiment of the present disclosure.

The present disclosure also provides a battery discharge limit control method using the above-described battery discharge limit control system. FIG. 4 is a flowchart showing a battery discharge limit control method according to an exemplary embodiment of the present disclosure. The method described herein below may be executed by a controller. Referring to FIG. 4, a battery discharge limit control method according to an exemplary embodiment of the present disclosure may be started from S11 determining, by the controller 100, whether the reverse shift stage is input.

In the S11, in response to determining that the reverse shift stage has not been input, the controller 100 may be configured to apply the state of charge defensive map for forward traveling such as the 'L1' in FIG. 2. Then, the controller 100 may be configured to determine the traveling mode of the vehicle S16, and set the output limit of the battery 15 to secure the preliminary charge amount that corresponds to the margin for driving the hybrid starter generator 13 when the vehicle is driven in the electric vehicle mode rather than the hybrid mode S17. When the vehicle is being driven in the hybrid mode in the S16, the controller 100 may be configured to perform the discharge limit control of the battery by applying the state of charge defensive map applied in the S15 S14 and drive the clutch or the motor of the vehicle as necessary S18.

Meanwhile, in response to determining that the shift stage instruction is the reverse shift stage in the S11, the controller 100 may be configured to apply the state of charge defensive map for reverse traveling such as the 'L2' in FIG. 2. Then, when the battery discharge limit is set to secure the preliminary charge amount for driving the hybrid starter generator 13 set upon the forward traveling in the previous electric vehicle mode, the discharge limit for securing the preliminary charge amount may be removed S13. Then, the controller 100 may be configured to perform the battery discharge limit control by applying the state of charge defensive map set in the S12 and drive the clutch 21 and the motor 11 for reverse operation.

As described above, the battery discharge limit control system and method according to various exemplary embodiments of the present disclosure may set the battery output limit to secure the sufficient state of charge of the battery for the reverse of the vehicle in the hybrid vehicle that reverses the vehicle by removing the reverse gear in the transmission and driving the motor in the reverse rotation, thereby enhancing the reverse operability of the vehicle and improving the merchantability of the vehicle.

As described above, while it has been shown and described with respect to the specific embodiments of the present disclosure, it will be apparent by those skilled in the art that various improvements and changes of the present disclosure may be made within the scope of the claims.

What is claimed is:

1. A battery discharge limit control system, comprising:
a motor driven by receiving the power stored in a battery;
a clutch connected to the rotary shaft of the motor;
an engine having the rotary shaft connected to the rotary shaft of the motor through the clutch;
a transmission configured to change a rotational speed of the rotary shaft of the motor or the engine based on the input of the shift stage instruction to output the rotational speed to a driving wheel of a vehicle;
a controller configured to open the clutch and driving the motor in the reverse rotation, when the input of the shift stage instruction is a reverse shift stage, the controller being configured to adjust the output of the motor by limiting the battery output based on the state of charge of the battery; and
a hybrid starter generator configured to crank the engine and synchronize the rotational speed of the engine with the rotational speed of the motor when switching from an electric vehicle mode that drives the motor to rotate the driving wheel to a hybrid mode that drives the engine to rotate the driving wheel; wherein the controller, in the electric vehicle mode, is configured to:
limit the output of the battery to secure a preliminary charge amount for driving the hybrid starter generator when the shift stage instruction is the forward shift stage, and
limit the output of the battery without considering the preliminary charge amount when the shift stage instruction is the reverse shift stage.

2. The battery discharge limit control system according to claim 1, wherein the controller is configured to apply the output by increasing an output limit value limiting the output of the battery when the shift stage instruction is the reverse shift stage rather than a forward shift stage.

3. The battery discharge limit control system according to claim 2, wherein the controller includes:
a first state of charge defensive map applied when the shift stage instruction is the forward shift stage and for storing the output limit value of the battery based on the state of charge of the battery; and
a second state of charge defensive map applied when the shift stage instruction is the reverse shift stage and for storing the output limit value of the battery based on the state of charge of the battery, and
wherein the output limit value of the battery of the second state of charge defensive map is greater than the output limit value of the battery of the first state of charge defensive map in a same state of charge.

4. A battery discharge limit control method, comprising:
a motor driven by receiving the power stored in a battery;
a clutch connected to the rotary shaft of the motor;
an engine having the rotary shaft connected to the rotary shaft of the motor through the clutch;
a transmission configured to change a rotational speed the rotary shaft of the motor or the engine based on the input of the shift stage instruction to output the rotational speed to a driving wheel of a vehicle;
a hybrid starter generator configured to crank the engine and synchronize the rotational speed of the engine with the rotational speed of the motor when switching from an electric vehicle mode that drives the motor to rotate the driving wheel to a hybrid mode that drives the engine to rotate the driving wheel; and
a controller configured to open the clutch and driving the motor in the reverse rotation, when the input of the shift stage instruction is a reverse shift stage, the controller further configured to:
determine whether the shift stage instruction is the reverse shift stage; and
limit the output of the battery by further increasing an output limit value limiting the output of the battery when the shift stage instruction is the reverse shift stage to more than when the shift stage instruction is a forward shift stage,
wherein limiting of the output of the battery includes:
limit, by the controller in the electric vehicle mode, the output of the battery to secure a preliminary charge amount for driving the hybrid starter generator when the shift stage instruction is the forward shift stage; and
limit, by the controller, the output of the battery without considering the preliminary charge amount when the shift stage instruction is the reverse shift stage.

5. The battery discharge limit control method according to claim 4, wherein the controller includes:
a first state of charge defensive map applied when the shift stage instruction is the forward shift stage and for storing the output limit value of the battery based on the state of charge of the battery; and
a second state of charge defensive map applied when the shift stage instruction is the reverse shift stage and for storing the output limit value of the battery greater than the output limit value of the battery of the first state of charge defensive map in the same state of charge, and
wherein the limiting of the output of the battery includes limiting, by the controller, the output of the battery by applying the second state of charge defensive map.

* * * * *